US010093226B1

(12) United States Patent
Lopez Gonzalez

(10) Patent No.: US 10,093,226 B1
(45) Date of Patent: Oct. 9, 2018

(54) DEPLOYABLE VEHICLE LIGHT ASSEMBLY

(71) Applicant: Ford Global Technologies, LLC, Dearborn, MI (US)

(72) Inventor: Luis M. Lopez Gonzalez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/672,655

(22) Filed: Aug. 9, 2017

(51) Int. Cl.
| | |
|---|---|
| *B60Q 1/00* | (2006.01) |
| *B60Q 3/57* | (2017.01) |
| *B60Q 3/51* | (2017.01) |
| *B60Q 3/74* | (2017.01) |
| *B60Q 3/85* | (2017.01) |
| *F21Y 115/10* | (2016.01) |
| *B64D 11/00* | (2006.01) |
| *F21V 21/24* | (2006.01) |

(52) U.S. Cl.
CPC ............. *B60Q 3/57* (2017.02); *B60Q 3/51* (2017.02); *B60Q 3/74* (2017.02); *B60Q 3/85* (2017.02); *B64D 2011/0053* (2013.01); *F21V 21/24* (2013.01); *F21Y 2115/10* (2016.08)

(58) Field of Classification Search
CPC ... B60Q 3/51; B60Q 3/56; B60Q 3/57; B60Q 3/74; B60Q 3/00–3/88; B64D 2011/0053; F21V 21/24
USPC ........................................................ 362/490
See application file for complete search history.

(56) References Cited

U.S. PATENT DOCUMENTS

| | | | | |
|---|---|---|---|---|
| 3,579,184 A | * | 5/1971 | Forestal | B60Q 1/2611 340/470 |
| 4,421,355 A | * | 12/1983 | Marcus | B60J 3/0282 296/97.5 |
| 4,511,954 A | * | 4/1985 | Marcus | B60J 3/0282 362/144 |
| 4,867,498 A | * | 9/1989 | Delphia | B60R 7/04 296/37.7 |
| 6,896,395 B2 | * | 5/2005 | McKenzie | B60Q 3/57 362/249.09 |
| 7,249,873 B2 | | 7/2007 | Tiesler et al. | |
| 7,651,250 B2 | | 1/2010 | Griffin | |
| 2007/0053194 A1 | * | 3/2007 | Tiesler | B60Q 3/51 362/490 |
| 2008/0013317 A1 | * | 1/2008 | Hinds | F21S 8/028 362/286 |
| 2012/0113666 A1 | * | 5/2012 | Slipp | B60Q 1/2611 362/523 |

FOREIGN PATENT DOCUMENTS

WO     9734779 A1    9/1997

\* cited by examiner

*Primary Examiner* — Sean Gramling
(74) *Attorney, Agent, or Firm* — Vichit Chea; Price Heneveld LLP

(57) ABSTRACT

A vehicle light assembly is provided that includes an extension mechanism coupled to an interior component on a vehicle and extendable between stowed and deployed positions, and a support member coupled to the extension mechanism. The vehicle light assembly also includes a rotary lamp rotationally coupled to the support member, wherein the lamp is rotatable relative to the support member to redirect light output from the lamp in a desired direction.

20 Claims, 3 Drawing Sheets

DEPLOYABLE VEHICLE LIGHT ASSEMBLY

FIELD OF THE INVENTION

The present invention generally relates to vehicle lighting, and more particularly relates to a vehicle interior dome and map/reading light assembly.

BACKGROUND OF THE INVENTION

Automotive vehicles, such as wheeled vehicles, are commonly equipped with a plurality of interior lighting devices for illuminating the passenger compartment. For example, automotive vehicles typically include a dome lamp for providing light illumination when one or more vehicle doors are open to provide general area lighting for occupants of the vehicle to move in and out of the vehicle. Additionally, automotive vehicles are commonly equipped with a plurality of reading lamps that provide lighting to enable passengers to read, view maps, and otherwise aid in vision. Dome and reading lights are typically fixed in the headliner or an overhead console and direct light in a fixed direction. It is therefore desirable to provide for an enhanced lighting system that allows for dome and reading light that offer enhanced functionality for passengers in the vehicle.

SUMMARY OF THE INVENTION

According to one aspect of the present invention, a vehicle light assembly is provided. The assembly includes an extension mechanism coupled to an interior component on a vehicle and extendable between stowed and deployed positions, a support member coupled to the extension mechanism, and a rotary lamp rotationally coupled to the support member, wherein the lamp is rotatable relative to the support member to redirect light output from the lamp in a desired direction.

Embodiments of the first aspect of the invention can include any one or a combination of the following features:
  the extension member comprises first and second scissor connected arms coupled to the interior component and the support member;
  the assembly further comprises a push latch mechanism for latching the support member in the stowed position;
  the rotary lamp is a reading light;
  the extension mechanism is connected to a headliner of the vehicle;
  the rotary lamp comprises a spherical portion that engages a portion of the support member and allows the rotary lamp to rotate in multiple axes;
  the rotary lamp is rotatable forward and rearward and further rotatable to the lateral sides;
  the lamp comprises a light source and a lens;
  the light source comprises at least one LED; and
  an extendable cover surrounding the extension mechanism.

According to another aspect of the present invention, a vehicle light assembly is provided. The assembly includes an extension mechanism coupled to an interior component on a vehicle and extendable between stowed and deployed positions, and a rotary lamp supported on the extension member, wherein the lamp is rotatable to redirect light output from the lamp in a desired direction.

Embodiments of the second aspect of the invention can include any one or a combination of the following features:
  the assembly further comprises a support member connected to the extension member and supporting the rotary lamp;
  the extension mechanism comprises first and second scissor connected arms coupled to the interior component and the support member;
  The assembly further comprises a push latch mechanism for latching the extension mechanism in the stowed position;
  the lamp is a reading light;
  the extension mechanism is connected to a headliner of the vehicle;
  the lamp comprises a spherical portion operatively coupled to the extension mechanism to allow the rotary lamp to rotate in multiple axes;
  the rotary lamp is rotatable forward and rearward and further rotatable to the sides;
  the lamp comprises a light source and a lens; and
  the light source comprises at least one LED.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
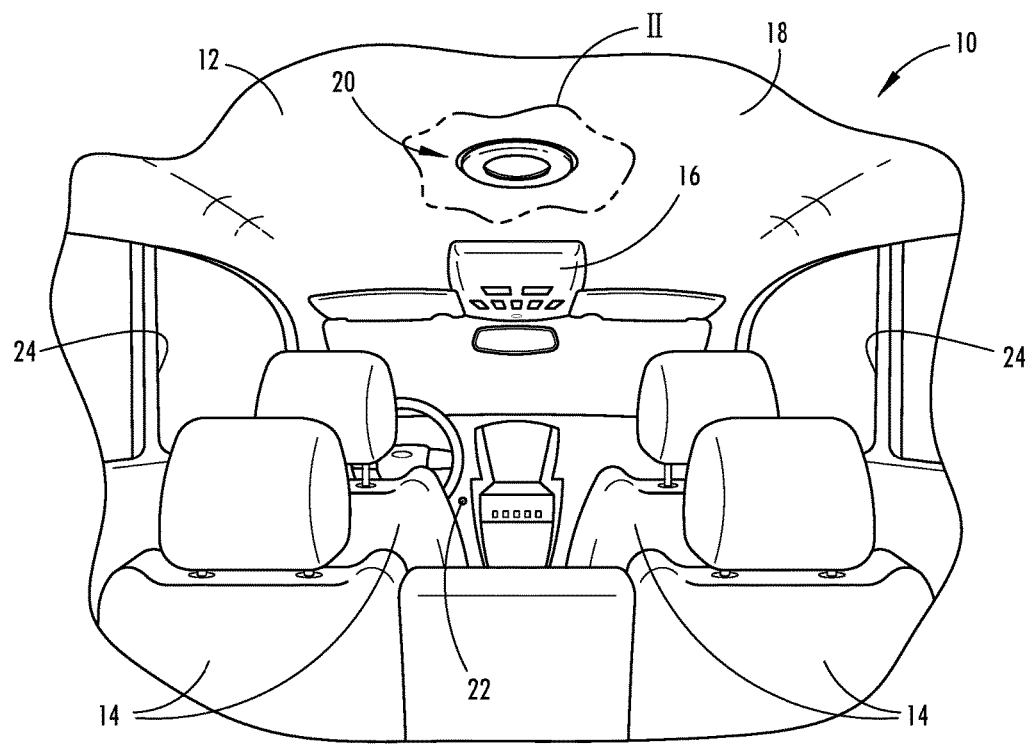
FIG. 1 is a rear perspective view of the interior of a vehicle having a dome/reading light assembly, according to one embodiment.

Referring now to FIG. 1, the passenger compartment 18 of an automotive vehicle 10 is generally illustrated having a light assembly 20, according to one embodiment. The vehicle 10 generally includes an overhead console 16 assembled to the interior side of the roof or ceiling of the passenger compartment, generally shown in the headliner 12 above the passenger seating area. The vehicle 10 also includes passenger seats 14 each adapted to hold a passenger for seating within the passenger compartment 18. Passengers may enter and exit from the vehicle 10 via side doors 24, each of which may operatively engage a dome light input switch which switches state based on whether the door is in the open position or closed position and activates dome lighting when the door is in the open position. Additionally, a dash mounted user input switch 22 may be provided on the dashboard or elsewhere in the vehicle and is generally accessible to the driver of the vehicle for controlling lights, including turning on and off one or more light assemblies 20.

The light assembly 20 may operate as a dome and/or reading light (lamp) to illuminate light within the interior of the passenger compartment 18 of the vehicle 10. The term "dome light" is recognized in the vehicle interior lighting art as a light that provides general area lighting. The term "reading light" is interchangeable with the term "map light" and both terms are known in the art for providing more focused light to enable passengers to read and view maps. In the embodiment shown, the light assembly 20 includes at least one light assembly 20 assembled to the interior of the vehicle 10 and movable about multiple axes to output light into one of a plurality of selectable light beam directions. The light assembly 20 may serve as a dome light or a reading light or both a dome light and a reading light. The vehicle may be equipped with a plurality of such light assemblies and the light assembly 20 may be located elsewhere on the vehicle 10 such as in the overhead console 16 or near the lateral sides of the headliner 12.

Figure 2:
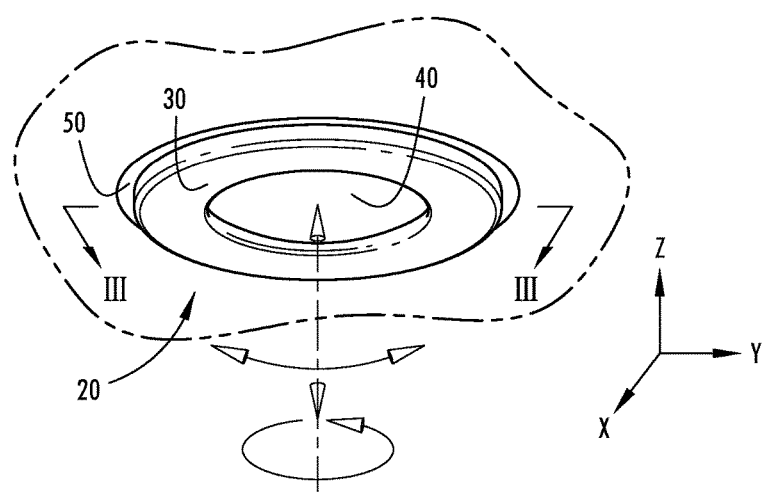
FIG. 2 is an enlarged view of section II of FIG. 1 further illustrating the dome/reading light assembly.

The light assembly 20 is further shown in FIG. 2 in the upward stowed position assembled and stowed at least partially within the headliner 12. The light assembly 20 is shown in the upward collapsed position recessed at least partially within the headliner 12 and is substantially conformal with the headliner 12. The light assembly 20 has a support member 30 supporting a rotary lamp 40 on the bottom side. The support member 30 and rotary lamp 40 may be extended downward to a deployed position and collapsed upward to the stowed position such that the rotary lamp 40 moves axially along the vertical Z-axis. The lamp 40 may further pivot or rotate about the vertical Z-axis in the left, right, forward and rearward directions towards the Y- and X-axes and in directions therebetween as explained herein. In addition, the lamp 40 may rotate or spin about the Z-axis to turn clockwise and counterclockwise.

Figure 3:
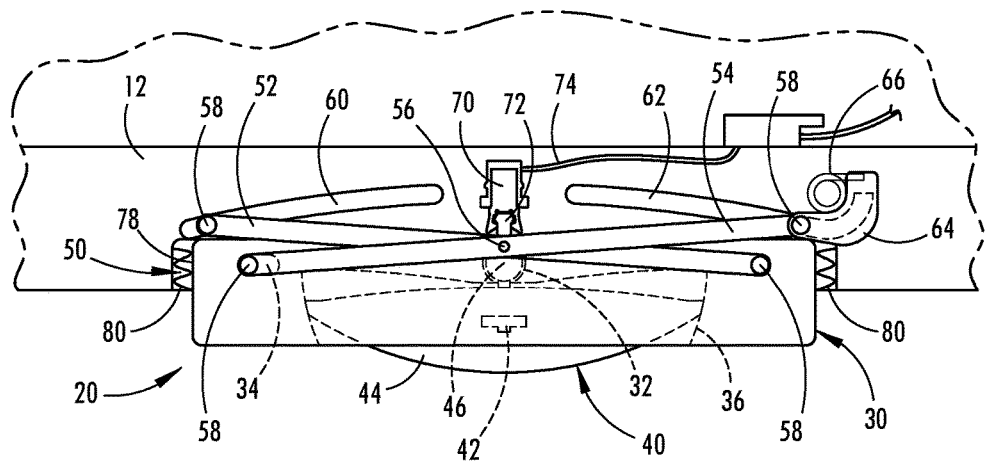
FIG. 3 is a cross-sectional view of the light assembly taken through line of FIG. 2 with the light assembly in the stowed position.
Figure 4:
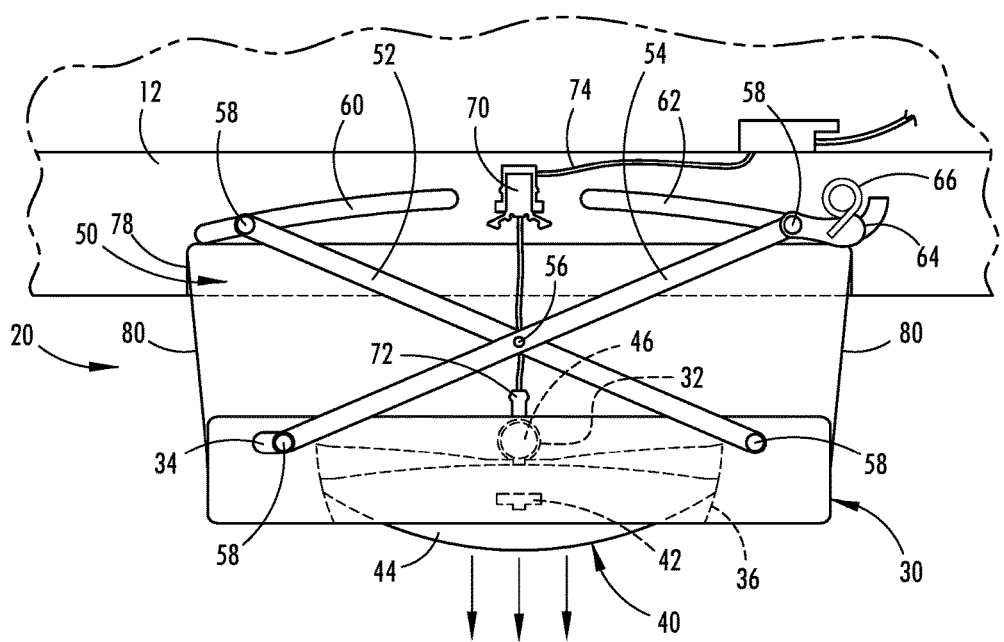
FIG. 4 is a cross-sectional view of the light shown in FIG. 3 with the light assembly shown in an extended deployed position.
Figure 5:
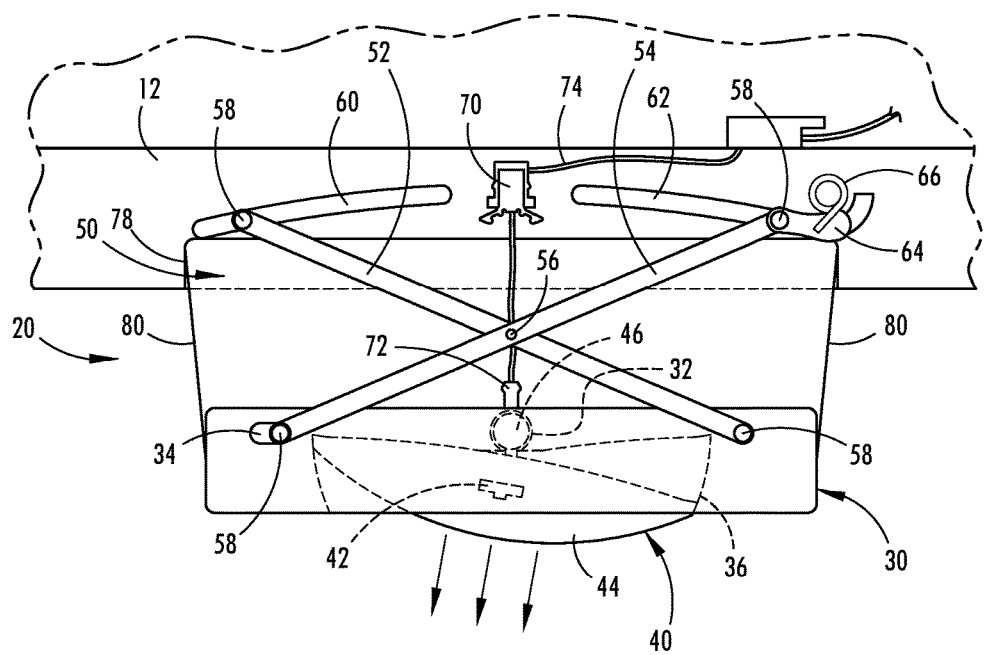
FIG. 5 is a cross-sectional view of the light assembly shown in FIG. 4 with the rotary lamp rotated in a first direction.
Figure 6:
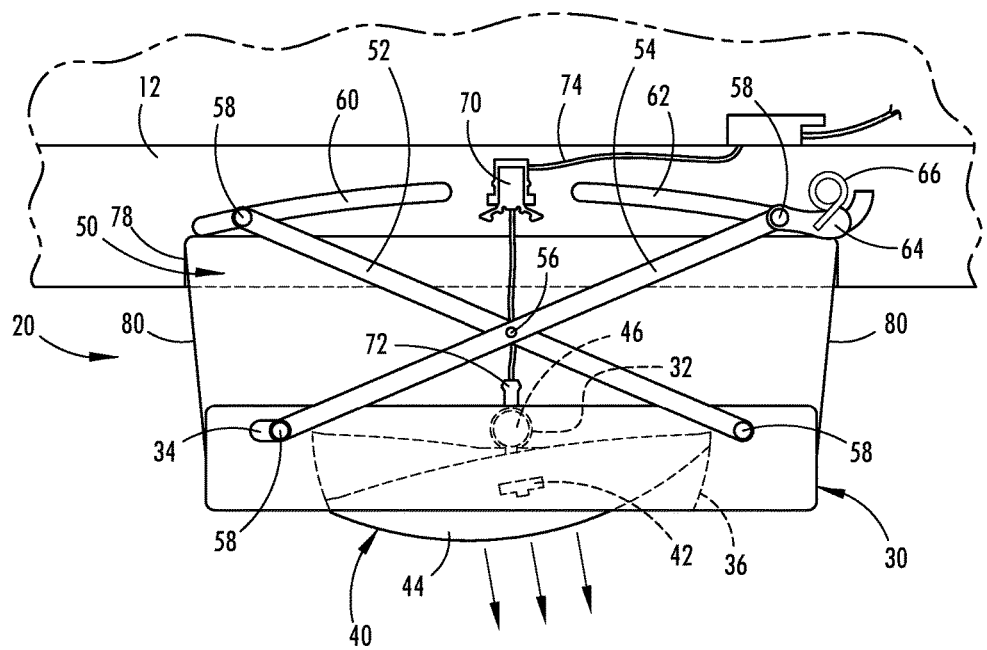
FIG. 6 is a cross-sectional view of the light assembly shown in FIG. 5 with the rotary lamp rotated in a second direction.

Referring to FIGS. 3-6, the vehicle light assembly 20 has an extension mechanism 50 coupled to an interior component of the vehicle, shown as the headliner 12 of the vehicle 10. The extension mechanism 50 is extendible along the Z-axis between the upward retracted, stowed position shown in FIG. 3 and the downward extended, deployed position shown in FIG. 4. The extension mechanism 50 includes a plurality of scissor connected arms connected at one end to the vehicle interior component, particularly the headliner 18, and also coupled at the opposite end to the support member 30. The plurality of scissor connected arms includes a first arm 52 pivotally connected to a second arm 54 in a scissor-like arrangement, wherein the two arms 52 and 54 are connected near a midpoint via pivot pin 56. The upper end of each of arms 52 and 54 includes a sliding pin 58 disposed within respective tracks 60 and 62, each shown as a slot, provided within the headliner 12 or a housing provided within the headliner 12. The tracks 60 and 62 are each shown having a slightly arcuate shape and each receiving one of sliding or rotating pins 58 such that pins 58 slide or rotate within tracks 60 and 62 to allow arms 52 and 54 to fold to a collapsed stowed position as shown in FIG. 3 and to extend to the extended deployed position as shown in FIG. 4.

The extension mechanism 50 also includes a flexible lever 64 connected to the pin 58 disposed within track 62. The flexible lever 64 may be made of an elastomeric material such as rubber or a thermoplastic elastomer (TPE). Additionally, a bias spring 66 is shown engaging the flexible lever 64 within track 62 to apply a spring biased force in a clockwise direction onto the flexible lever 64. The bias spring 66 may include a coil spring, according to one embodiment. As such, the bias spring 66 biases the flexible lever 64 to push pin 58 within track 62 to cause the extension arms 52 and 54 of the extension mechanism 50 to be extended to the deployed position. The bias spring 66 thereby biases the extension mechanism 50 to the extended position with a spring bias force.

The lamp support member 30 is connected to the bottom end of the extension mechanism 50, particularly connected to the ends of arms 52 and 54 via the lower end sliding pins 58. The support member 30 may include one or more tracks 34, such as slot 34, that allow at least one of the sliding pins 58 to move laterally as the extension mechanism 50 moves in a scissor-like movement between the extended and retracted positions. The support member 30 is shown having a latch member 72 in the form of a striker provided on the top surface thereof and arranged to matingly engage a push latch receptacle 70 in the headliner 12 when the extension member 50 is moved to the retracted stowed position. The latch member 72 and push latch receptacle 70 forms a push latch assembly in which a user may push upward on support member 30 or the rotary lamp 40 supported thereon to force latch member 72 to engage within receptacle 70 and lock the assembly in the retracted position. When the latch is locked, a user may further push again on the support member 30 or rotary lamp 40 so as to unlatch latch member 72 from receptacle 70. It should be appreciated that other latch arrangements to hold and release the extension mechanism 50 may be employed, according to other embodiments.

The vehicle light assembly 20 further includes the rotary lamp 40 rotationally coupled to the support member 30. The rotary lamp 40 includes a spherical connector 46 provided on the upper side thereof and arranged to fit within a generally spherical-shaped opening 32 within the lower surface of support member 30. The generally spherical-shaped opening 32 within the support member 30 is slightly larger than the spherical-shaped connector 46 on the rotary lamp 40 such that the lamp 40 may pivot or rotate about the vertical Z-axis to rotate left and right in the X-axis direction, forward and rearward in the Y-axis direction and in directions between the X-axis and Y-axis. The rotary lamp 40 is shown disposed within an opening 36 formed in the bottom surface of the support member 30. The opening 36 allows the rotary lamp 40 to be disposed therein and to move in various direction and tilt without interference from the support member 30.

The rotary lamp 40 may be rotated along various axes and in multiple directions to redirect light in a desired direction. The lamp 40 may include a light source 42, such as one or more light-emitting diodes (LEDs), according to one embodiment. According to other embodiments, the light source 42 may include other light sources, such as one or move incandescent bulbs. The light source 42 may be powered by electrical power transmitted on line 74 and supplied by the vehicle battery. The lamp 40 may further include an optical element such as lens 44 disposed in front of the light source to help direct or focus light output in a desired direction.

The vehicle light assembly 20 may be actuated by a user pushing on the lamp 40 and/or support member 30 to cause the latch member 72 to be released from latch receptacle 70. This allows the extension member 50 to extend the support member 30 and rotary lamp 40 downward due to the bias spring force caused by spring 66 and gravity to the extended deployed position. It should be appreciated that a light activation switch may be included in the latch receptacle 70, such that when the latch is pressed and unlatched to allow the extension member 50 to extend to the fully deployed position, the light source 42 may be activated to turn on and generate light output. The light source 42 may be activated to turn off when the latch is in a position that maintains the extension mechanism 50 in the stowed position. It should further be appreciated that the light source 42 may be activated based on other user inputs, such as a user switch 22 as seen in FIG. 1 or when the vehicle doors 24 are in an open position and a door sensor senses the open position.

The light assembly 20 may further include an extendable cover 80 connected within opening 78 in the lower surface of the support member 30 and to the support member 30. The extendable cover is flexible or retractable so that it retracts as seen in FIG. 3 when the extension mechanism 50 is retracted, and extends as seen in FIG. 4 when the extension mechanism 50 is extended. As such, the extendable cover acts as a curtain to conceal the extension mechanism 50 and prevent objects from interfering with the extension mechanism 50.

When the extension mechanism 50 is in the extended, deployed position as shown in FIG. 4, the rotary lamp 40 is extended in the downward direction along the vertical Z-axis. A user may rotate the rotary lamp to any position about the vertical Z-axis. In doing so, the spherical-shaped connector 46 within spherical-shaped housing 32 allows the rotational movement of the lamp 40 in multiple directions. Further, a user may tilt the rotary lamp 40 in any direction along the X- and Y-axes, such that the lamp 40 may be tilted left, right, forward, back or anywhere in between. A user may also spin the lamp 40 about the Z-axis for further light alignment. This allows a user to redirect the light beam output in a desired direction. A user may thereby focus light into any desired direction within the vehicle 10.

Accordingly, the vehicle lighting assembly 20 advantageously provides for a light arrangement that is movable in multiple directions. This allows the user to redirect a beam of light within the vehicle to a desired direction, thus providing enhanced light functionality.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle light assembly comprising:
   a rotary lamp rotatable to redirect light output from the lamp in a desired direction; and
   first and second scissor connected arms coupled between an interior component on a vehicle and the rotary lamp to move the rotary lamp between stowed and extended positions.

2. The light assembly of claim 1 further comprising a support member coupled between the first and second scissor connected arms and the rotary lamp.

3. A vehicle light assembly comprising:
   an extension mechanism coupled to an interior component on a vehicle and extendable between stowed and deployed positions; and
   a rotary lamp supported on the extension member, wherein the lamp is rotatable to redirect light output from the lamp in a desired direction, wherein the extension mechanism comprises first and second scissor connected arms coupled between the interior component and the rotary lamp.

4. The light assembly of claim 3 further comprising a support member connected to the extension member and supporting the rotary lamp.

5. The light assembly of claim 3 further comprising a push latch mechanism for latching the extension mechanism in the stowed position.

6. The light assembly of claim 3, wherein the lamp is a reading light.

7. The light assembly of claim 3, wherein the extension mechanism is connected to a headliner of the vehicle.

8. The light assembly of claim 3, wherein the lamp comprises a spherical portion operatively coupled to the extension mechanism to allow the rotary lamp to rotate in multiple axes.

9. The light assembly of claim 8, wherein the rotary lamp is rotatable forward and rearward and further rotatable to the sides.

10. The light assembly of claim 3, wherein the lamp comprises a light source and a lens.

11. The light assembly of claim 10, wherein the light source comprises at least one LED.

12. A vehicle light assembly comprising:
    an extension mechanism coupled to an interior component on a vehicle and extendable between stowed and deployed positions;
    a support member coupled to the extension mechanism; and
    a rotary lamp rotationally coupled to the support member, wherein the lamp is rotatable relative to the support member to redirect light output from the lamp in a desired direction, wherein the extension mechanism comprises first and second scissor connected arms coupled to the interior component and the support member.

13. The light assembly of claim 12 further comprising a push latch mechanism for latching the support member in the stowed position.

14. The light assembly of claim 12, wherein the rotary lamp is a reading light.

15. The light assembly of claim 12, wherein the extension mechanism is connected to a headliner of the vehicle.

16. The light assembly of claim 12, wherein the rotary lamp comprises a spherical portion that engages a portion of the support member and allows the rotary lamp to rotate in multiple axes.

17. The light assembly of claim 16, wherein the rotary lamp is rotatable forward and rearward and further rotatable to the lateral sides.

18. The light assembly of claim 12, wherein the lamp comprises a light source and a lens.

19. The light assembly of claim 18, wherein the light source comprises at least one LED.

20. The light assembly of claim 12 further comprising an extendable cover surrounding the extension mechanism.

* * * * *